United States Patent
Scharf et al.

(10) Patent No.: US 7,463,609 B2
(45) Date of Patent: Dec. 9, 2008

(54) INTERFERENCE CANCELLATION WITHIN WIRELESS TRANSCEIVERS

(75) Inventors: Louis L. Scharf, Fort Collins, CO (US); Vijay Nagarajan, Boulder, CO (US)

(73) Assignee: Tensorcomm, Inc, Greenwood Village, CO (US)

( * ) Notice: Subject to any disclaimer, the term of this patent is extended or adjusted under 35 U.S.C. 154(b) by 380 days.

(21) Appl. No.: 11/192,763

(22) Filed: Jul. 29, 2005

(65) Prior Publication Data

US 2007/0025299 A1 Feb. 1, 2007

(51) Int. Cl.
*H04B 7/216* (2006.01)

(52) U.S. Cl. .................... 370/335; 375/144; 375/346

(58) Field of Classification Search ............... 370/320, 370/335, 342, 441; 375/148, 136, 144, 346, 375/348, 349, 350

See application file for complete search history.

(56) References Cited

U.S. PATENT DOCUMENTS

| | | | |
|---|---|---|---|
| 3,742,201 A | 6/1973 | Groginsky | |
| 4,088,955 A | 5/1978 | Baghdady | |
| 4,309,769 A | 1/1982 | Taylor, Jr. | |
| 4,359,738 A | 11/1982 | Lewis | |
| 4,601,046 A | 7/1986 | Halpern | |
| 4,665,401 A | 5/1987 | Garrard et al. | |
| 4,670,885 A | 6/1987 | Parl et al. | |
| 4,713,794 A | 12/1987 | Byington et al. | |
| 4,780,885 A | 10/1988 | Paul et al. | |
| 4,856,025 A | 8/1989 | Takai | |
| 4,893,316 A | 1/1990 | Janc et al. | |
| 4,922,506 A | 5/1990 | McCallister et al. | |
| 4,933,639 A | 6/1990 | Barker | |
| 4,965,732 A | 10/1990 | Roy, III et al. | |
| 5,017,929 A | 5/1991 | Tsuda | |
| 5,099,493 A | 3/1992 | Zeger et al. | |
| 5,105,435 A | 4/1992 | Stilwell | |
| 5,109,390 A | 4/1992 | Gilhousen et al. | |
| 5,119,401 A | 6/1992 | Tsujimoto | |
| 5,136,296 A | 8/1992 | Roettger et al. | |

(Continued)

FOREIGN PATENT DOCUMENTS

DE 4201439 A1 7/1993

(Continued)

OTHER PUBLICATIONS

US Appl. No. 11/129,131, filed May 12, 2005, Micheal D. Gallagher et al., Non-final Office of a Related Case (mailed Feb. 21, 2007).

(Continued)

*Primary Examiner*—CongVan Tran
(74) *Attorney, Agent, or Firm*—Anand P. Narayan

(57) ABSTRACT

The receiver includes a Rake receiver for separating a received signal into multipath components, an interference selector for selecting interference symbols corresponding to interfering paths and subchannels, a synthesizer for synthesizing an interference signal from selected paths and estimated subchannel symbols, and a canceller for constructing a projection operator or a scale-invariant subtraction operator to cancel selected interference in multipath components of the received signal, or from the received signal itself. The interference canceller may use a sequence of symbol estimates to simultaneously cancel inter-channel interference and inter-symbol interference. Interference cancellers may be placed at one or more locations within the receiver chain.

21 Claims, 3 Drawing Sheets

U.S. PATENT DOCUMENTS

| | | | |
|---|---|---|---|
| 5,151,919 A | 9/1992 | Dent | |
| 5,218,359 A | 6/1993 | Minamisono | |
| 5,218,619 A | 6/1993 | Dent | |
| 5,220,687 A | 6/1993 | Ichikawa et al. | |
| 5,224,122 A | 6/1993 | Bruckert | |
| 5,237,586 A | 8/1993 | Bottomley | |
| 5,263,191 A | 11/1993 | Dickerson | |
| 5,280,472 A | 1/1994 | Gilhousen et al. | |
| 5,305,349 A | 4/1994 | Dent | |
| 5,325,394 A | 6/1994 | Bruckert | |
| 5,327,578 A | 7/1994 | Breeden et al. | |
| 5,333,175 A | 7/1994 | Ariyavisitakul et al. | |
| 5,343,493 A | 8/1994 | Karimullah | |
| 5,343,496 A | 8/1994 | Honig et al. | |
| 5,347,535 A | 9/1994 | Karasawa et al. | |
| 5,353,302 A | 10/1994 | Bi | |
| 5,377,183 A | 12/1994 | Dent | |
| 5,386,202 A | 1/1995 | Cochran et al. | |
| 5,390,207 A | 2/1995 | Fenton et al. | |
| 5,394,110 A | 2/1995 | Mizoguchi | |
| 5,396,256 A | 3/1995 | Chiba et al. | |
| 5,437,055 A | 7/1995 | Wheatley, III | |
| 5,440,265 A | 8/1995 | Cochran et al. | |
| 5,448,600 A | 9/1995 | Lucas | |
| 5,475,677 A | 12/1995 | Arnold et al. | |
| 5,481,570 A | 1/1996 | Winters | |
| 5,488,649 A | 1/1996 | Schellinger | |
| 5,506,865 A | 4/1996 | Weaver, Jr. | |
| 5,509,052 A | 4/1996 | Chia et al. | |
| 5,513,176 A | 4/1996 | Dean et al. | |
| 5,515,420 A | 5/1996 | Urasaka et al. | |
| 5,533,011 A | 7/1996 | Dean et al. | |
| 5,553,098 A | 9/1996 | Cochran et al. | |
| 5,602,833 A | 2/1997 | Zehavi | |
| 5,644,592 A | 7/1997 | Divsalar | |
| 5,736,964 A | 4/1998 | Ghosh et al. | |
| 5,787,130 A | 7/1998 | Kotzin et al. | |
| 5,812,511 A | 9/1998 | Kawamura et al. | |
| 5,822,767 A | 10/1998 | MacWilliams | |
| 5,844,521 A | 12/1998 | Stephens et al. | |
| 5,859,613 A | 1/1999 | Otto | |
| 5,862,345 A | 1/1999 | Okanoue et al. | |
| 5,872,540 A | 2/1999 | Casabona | |
| 5,872,776 A | 2/1999 | Yang | |
| 5,894,500 A | 4/1999 | Bruckert et al. | |
| 5,926,761 A | 7/1999 | Reed et al. | |
| 5,930,229 A | 7/1999 | Yoshida et al. | |
| 5,953,369 A | 9/1999 | Suzuki | |
| 5,960,361 A | 9/1999 | Chen | |
| 5,960,364 A | 9/1999 | Dent | |
| 5,978,413 A | 11/1999 | Bender | |
| 5,987,010 A | 11/1999 | Schnizlein | |
| 5,995,499 A | 11/1999 | Hottinen et al. | |
| 6,002,727 A | 12/1999 | Uesugi | |
| 6,014,373 A | 1/2000 | Schilling et al. | |
| 6,018,317 A | 1/2000 | Dogan et al. | |
| 6,032,056 A | 2/2000 | Reudink | |
| 6,088,383 A | 7/2000 | Suzuki et al. | |
| 6,101,385 A | 8/2000 | Monte et al. | |
| 6,104,712 A | 8/2000 | Robert et al. | |
| 6,115,409 A | 9/2000 | Upadhyay et al. | |
| 6,127,973 A | 10/2000 | Choi et al. | |
| 6,131,013 A | 10/2000 | Bergstrom et al. | |
| 6,137,788 A | 10/2000 | Sawahashi et al. | |
| 6,141,332 A | 10/2000 | Lavean | |
| 6,154,443 A | 11/2000 | Huang et al. | |
| 6,157,685 A | 12/2000 | Tanaka et al. | |
| 6,157,842 A | 12/2000 | Kaisson et al. | |
| 6,157,847 A | 12/2000 | Buehrer et al. | |
| 6,163,696 A | 12/2000 | Bi et al. | |
| 6,166,690 A | 12/2000 | Lin et al. | |
| 6,172,969 B1 | 1/2001 | Kawakami et al. | |
| 6,175,587 B1 | 1/2001 | Madhow et al. | |
| 6,192,067 B1 | 2/2001 | Toda et al. | |
| 6,201,799 B1 | 3/2001 | Huang et al. | |
| 6,215,812 B1 | 4/2001 | Young et al. | |
| 6,219,376 B1 | 4/2001 | Zhodzishsky et al. | |
| 6,222,828 B1 | 4/2001 | Ohlson et al. | |
| 6,230,180 B1 | 5/2001 | Mohamed | |
| 6,233,229 B1 | 5/2001 | Ranta et al. | |
| 6,233,459 B1 | 5/2001 | Sullivan et al. | |
| 6,240,124 B1 | 5/2001 | Wiedeman et al. | |
| 6,252,535 B1 | 6/2001 | Kober et al. | |
| 6,256,336 B1 | 7/2001 | Rademacher et al. | |
| 6,259,688 B1 | 7/2001 | Schilling et al. | |
| 6,263,208 B1 | 7/2001 | Chang et al. | |
| 6,266,529 B1 | 7/2001 | Chheda | |
| 6,275,186 B1 | 8/2001 | Kong | |
| 6,278,726 B1 | 8/2001 | Mesecher et al. | |
| 6,282,231 B1 | 8/2001 | Norman et al. | |
| 6,282,233 B1 | 8/2001 | Yoshida | |
| 6,285,316 B1 | 9/2001 | Nir et al. | |
| 6,285,319 B1 | 9/2001 | Rose | |
| 6,285,861 B1 | 9/2001 | Bonaccorso et al. | |
| 6,301,289 B1 | 10/2001 | Bejjani et al. | |
| 6,304,618 B1 | 10/2001 | Hafeez et al. | |
| 6,308,072 B1 | 10/2001 | Labedz et al. | |
| 6,310,704 B1 | 10/2001 | Dogan et al. | |
| 6,317,453 B1 | 11/2001 | Chang | |
| 6,321,090 B1 | 11/2001 | Soliman | |
| 6,324,159 B1 | 11/2001 | Mennekens et al. | |
| 6,327,471 B1 | 12/2001 | Song | |
| 6,330,460 B1 | 12/2001 | Wong et al. | |
| 6,333,947 B1 | 12/2001 | van Heeswyk et al. | |
| 6,351,235 B1 | 2/2002 | Stilp | |
| 6,351,642 B1 | 2/2002 | Corbett et al. | |
| 6,359,874 B1 | 3/2002 | Dent | |
| 6,362,760 B2 | 3/2002 | Kober et al. | |
| 6,363,104 B1 | 3/2002 | Bottomley | |
| 6,377,636 B1 | 4/2002 | Paulraj et al. | |
| 6,380,879 B2 | 4/2002 | Kober et al. | |
| 6,385,264 B1 | 5/2002 | Terasawa | |
| 6,396,804 B2 | 5/2002 | Odenwalder | |
| 6,404,760 B1 | 6/2002 | Holtzman et al. | |
| 6,426,819 B1 | 7/2002 | Crimmins et al. | |
| 6,430,216 B1 | 8/2002 | Kober et al. | |
| 6,434,389 B1 | 8/2002 | Meskanen et al. | |
| 6,459,693 B1 | 10/2002 | Park et al. | |
| 6,498,934 B1 | 12/2002 | Muller | |
| 6,501,788 B1 | 12/2002 | Wang | |
| 6,515,980 B1 | 2/2003 | Bottomley | |
| 6,570,909 B1 | 5/2003 | Kansakoski | |
| 6,574,270 B1 | 6/2003 | Madkour | |
| 6,580,771 B2 | 6/2003 | Kenney | |
| 6,584,115 B1 | 6/2003 | Suzuki | |
| 6,590,888 B1 | 7/2003 | Ohshima | |
| 6,633,614 B1 | 10/2003 | Barton et al. | |
| 6,680,727 B2 | 1/2004 | Butler | |
| 6,725,025 B1* | 4/2004 | Schmidl et al. | 455/278.1 |
| 6,798,737 B1 | 9/2004 | Dabak | |
| 6,801,565 B1 | 10/2004 | Bottomley | |
| 6,853,851 B1 | 2/2005 | Rautiola et al. | |
| 7,272,176 B2* | 9/2007 | Wei et al. | 375/232 |
| 7,324,584 B1* | 1/2008 | Vigneron et al. | 375/150 |
| 2001/0003443 A1 | 6/2001 | Velazquez et al. | |
| 2001/0020912 A1 | 9/2001 | Naruse et al. | |
| 2001/0021646 A1 | 9/2001 | Antonucci et al. | |
| 2001/0046266 A1 | 11/2001 | Rakib et al. | |
| 2002/0001299 A1 | 1/2002 | Petch et al. | |
| 2002/0032030 A1 | 3/2002 | Berglund et al. | |
| 2002/0051433 A1 | 5/2002 | Affes et al. | |
| 2002/0059516 A1 | 5/2002 | Turtiainen et al. | |
| 2002/0172173 A1 | 11/2002 | Schilling et al. | |
| 2002/0176488 A1 | 11/2002 | Kober et al. | |

| | | | |
|---|---|---|---|
| 2002/0196840 A1 | 12/2002 | Anderson et al. | |
| 2003/0053526 A1 | 3/2003 | Reznik | |
| 2003/0095529 A1* | 5/2003 | Petre et al. | 370/342 |
| 2003/0112904 A1* | 6/2003 | Fuller et al. | 375/350 |
| 2003/0172264 A1 | 9/2003 | Dillon | |
| 2003/0176181 A1 | 9/2003 | Boesjes | |
| 2003/0202486 A1 | 10/2003 | Anton, Jr. et al. | |
| 2003/0219022 A1 | 11/2003 | Dillon et al. | |
| 2003/0226017 A1 | 12/2003 | Palekar et al. | |
| 2004/0010620 A1 | 1/2004 | Salo et al. | |
| 2004/0025018 A1 | 2/2004 | Haas et al. | |
| 2004/0068653 A1 | 4/2004 | Fascenda | |
| 2004/0077346 A1 | 4/2004 | Krenik et al. | |
| 2004/0077354 A1 | 4/2004 | Jason et al. | |
| 2004/0087307 A1 | 5/2004 | Ibe et al. | |
| 2004/0203812 A1* | 10/2004 | Malladi et al. | 455/450 |
| 2006/0007895 A1* | 1/2006 | Coralli et al. | 370/335 |
| 2006/0153283 A1* | 7/2006 | Scharf et al. | 375/148 |
| 2006/0229051 A1* | 10/2006 | Narayan et al. | 455/296 |

FOREIGN PATENT DOCUMENTS

| | | |
|---|---|---|
| DE | 4326843 A1 | 2/1995 |
| DE | 4343959 A1 | 6/1995 |
| EP | 0558910 A1 | 1/1993 |
| EP | 0610989 A2 | 1/1994 |
| GB | 2280575 A | 2/1995 |
| JP | 2000-13360 A | 1/2000 |
| WO | WO 93/12590 | 6/1995 |
| WO | WO2004036770 | 4/2004 |
| WO | PCT/US2005/016767 | 11/2006 |

OTHER PUBLICATIONS

US Appl. No. 11/226,610, filed Sep. 13, 2005, Gallagher, Michael, Final-Office Action of a Related Case (mailed Aug. 18, 2006).

Mitra, et al., Adaptive Decorrelating Detectors for CDMA Systems, Accepted for Wireless Communications Journal, Accepted May 1995.

Schneider, Optimum Detection of Code Division Multiplexed Signals, IEEE Transactions on Aerospace and Electronic Systems, Jan. 1979, vol. AES-15 No. 1.

Mitra, et al., Adaptive Receiver Algorithms for Near-Far Resistant CDMA, IEEE Transactions of Communications, Apr. 1995.

Lupas, et al. Near-Far Resistance of Multiuser Detectors in Asynchronous Channels, IEEE Transactions on Communications, Apr. 1990, vol. 38, No. 4.

Lupas, et al., Linear Multiuser Detectors for Synchronous Code-Division Multiple-Access Channels, IEEE Transactions on Information Theory, Jan. 1989, vol. 35, No. 1.

Kohno, et al., Cancellation Techniques of Co-Channel Interference in Asynchronous Spread Spectrum Multiple Access Systems, May 1983, vol. J 56-A. No. 5.

Garg, et al., Wireless and Personal Communications Systems, 1996, pp. 79-151, Prentice Hall, Upper Saddle River, NJ, US.

Cheng, et al., Spread-Spectrum Code Acquisition in the Presence of Doppler Shift and Data Modulation, IEEE Transactions on Communications, Feb. 1990, vol. 38, No. 2.

Behrens et al., Parameter Estimation in the Presence of Low Rank Noise, pp. 341-344, Maple Press, 1988.

Best, Phase-Locked Loops—Design, Simulation, and Applications, pp. 251-287, McGraw-Hill, 1999.

Iltis, Multiuser Detection of Quasisynchronous CDMA Signals Using Linear Decorrelators, IEEE Transactions on Communications, Nov. 1996, vol. 44, No. 11.

Rappaport, Wireless Communications—Principles & Practice, 1996, pp. 518-533, Prentice Hall, Upper Saddle River, NJ, US.

Scharf, et al., Matched Subspace Detectors, IEEE Transactions on Signal Processing, Aug. 1994, vol. 42, No. 8.

Price et al., A Communication Technique for Multipath Channels, Proceedings to the IRE, 1958, vol. 46, The Institute of Radio Engineers, New York, NY, US.

Affes et al., Interference Subspace Rejection: A Framework for Multiuser Detection in Wideband CDMA, IEEE Journal on Selected Areas in Communications, Feb. 2002, vol. 20, No. 2.

Schlegel et al., Coded Asynchronous CDMA and its Efficient Detection, IEEE Transactions on Information Theory, Nov. 1998, vol. 44, No. 7.

Xie et al., A family of Suboptimum Detectors for Coherent Multiuser Communications, IEEE Journal on Selected Areas in Communications, May 1990, vol. 8, No. 4.

Viterbi, Very Low Rate Convolutional Codes for Maximum Theoretical Performance of Spread Spectrum Multiple-Access Channels, IEEE Journal on Selected Areas in Communications, May 1990, vol. 8, No. 4.

Viterbi, CDMA—Principles of Spread Spectrum Communication, 1995; pp. 11-75 and 179-233, Addison-Wesley, Reading, MA, US.

Verdu, Mimimum Probability of Error for Asynchronous Gaussian Multiple-Access Channels, IEEE Transactions on Information Theory, Jan. 1986, vol. IT-32, No. 1.

Kaplan, Understanding GPS—Principles and Applications, 1996, pp. 83-236, Artech House, Norwood, MA, US.

Scharf, Statistical Signal Processing—Detection, Estimation, and Time Series Analysis, 1990, pp. 23-75 and 103-178, Addison-Wesley, Reading, MA US.

Stimson, Introduction to Airborne Radar 2nd edition, 1998, pp. 163-176 and 473-491, SciTech Publishing, Mendham, NJ, US.

Behrens et al., Signal Processing Applications of Oblique Projection Operators, IEEE Transactions on Signal Processing, Jun. 1994, vol. 42, No. 6.

Alexander et al., A Linear Receiver for Coded Multiuser CDMA, IEEE Transactions on Communications, May 1997, vol. 45, No. 5.

Schlegel et al., Multiuser Projection Receivers, IEEE Journal on Selected Areas in Communications, Oct. 1996, vol.14, No. 8.

Halper et al., Digital-to-Analog Conversio n by Pulse-Count Modulation Methods, IEEE Transactions on Instrumentation and M easurement, Aug. 1996, vol. 45, No. 4.

Ortega et al., Analog to Digital and Digital to Analog Conversion Based on Stochastic Logic, IEEE 0-7803-3026-9/95, 1995.

Frankel et al., High-performance photonic analogue digital converter, Electronic Letters, Dec. 4, 1997, vol. 33, No. 25.

Lin et al., Digital Filters for High Performance Audio Delta-sigma Analog-to-digital and Digital-to-analog Conversions, Proceedings of ICSP, Crystal Semiconductor Corporation, 1996, Austin, TX, US Thomas, Thesis for the Doctor of Philosophy Degree, UMI Dissertation Services, Jun. 1996, Ann Arbor, MI, US.

Schlegel et al., Projection Receiver: A New Efficient Multi-User Detector, IEEE, 1995, 0-7803-2509-5/95.

Behrens, Subspace Signal Processing in Structured Noise, UMI Dissertation Services, Jun. 1990, Ann Arbor, MI, US.

* cited by examiner

INTERFERENCE CANCELLATION WITHIN WIRELESS TRANSCEIVERS

BACKGROUND

1. Field of the Invention

The invention generally relates to the field of signal processing for wireless communications. More specifically the invention is related to efficient projections of signals and variations thereof for the purpose of reducing the effects of interference.

2. Discussion of the Related Art

Multipath and other forms of interference inherently limit the performance and capacity of wireless communication networks. Common wireless transmission protocols, including Code Division Multiple Access (CDMA) and Wideband CDMA (W-CDMA) are interference-limited both in uplink and downlink communications.

Advanced signal processing at the receiver can mitigate interference and thereby increase network capacity and coverage. A well-known interference-mitigation technique employs an orthogonal projection canceller configured to cancel selected interference from a received baseband signal.

FIG. 1A shows a baseband portion of a prior-art Rake finger configured to project out interference from a received baseband signal. A projection canceller 102 precedes a baseband front-end 103, a descrambler (e.g., PN descrambler 105), and a despreader (e.g., Walsh despreader 107). An RF front-end (not shown) and a matched filter (not shown) typically precede the projection canceller 102. The baseband front-end 103 may include a delay compensator (not shown), a chip-rate sampler (not shown), and a serial-to-parallel converter (not shown) for producing a digitized baseband signal.

Symbols on interfering subchannels and multipaths are identified, estimated, and used to synthesize an interfering signal, such as shown in FIG. 2A. An interference selector 209 identifies which subchannels potentially interfere with a signal of interest and produces symbol estimates for combinations of selected interfering subchannels and multipath components. A transmission synthesizer 211 uses the symbol estimates and subchannel information to synthesize transmitted interference. The synthesized transmitted interference may be distorted by a channel emulator 213 configured to reproduce channel distortions measured from the received signal. The channel emulator 213 output is processed by a projection canceller 202 configured to project the received baseband signal onto a subspace that is orthogonal to an interference space generated by the synthesized interfering signal.

SUMMARY OF THE INVENTION

Embodiments of the invention provide for placement of a canceller (such as a canceller comprising a projection operator or a scale-invariant subtraction operator) upstream or downstream in a Rake receiver relative to a baseband front-end. In one embodiment of the invention, a canceller follows a baseband front-end in a Rake finger. In another embodiment, a canceller may be placed between a descrambler (e.g., a PN descrambler) and a despreader (e.g., a Walsh despreader). In yet another embodiment of the invention, a canceller may follow the despreader. In each embodiment, a synthesized interfering signal is produced to conform to the type of received baseband signal processed by the canceller, wherein the type of received baseband signal depends on the location of the canceller in the receiver. In each of these embodiments, the canceller may provide for equalization.

Receivers and cancellation systems described herein may be employed in subscriber-side devices (e.g., cellular handsets) and/or server-side devices (e.g., cellular base stations). Chipsets for subscriber-side and/or server-side devices may be configured to perform at least some of the receiver and/or cancellation functionality of the embodiments described herein.

Although particular embodiments are described herein, many variations and permutations of these embodiments fall within the scope and spirit of the invention. Although some benefits and advantages of the preferred embodiments are mentioned, the scope of the invention is not intended to be limited to particular benefits, uses, or objectives. Rather, embodiments of the invention are intended to be broadly applicable to different wireless technologies, system configurations, networks, and transmission protocols, some of which are illustrated by way of example in the figures and in the following description of the preferred embodiments. The detailed description and drawings are merely illustrative of the invention rather than limiting, the scope of the invention being defined by the appended claims and equivalents thereof.

DESCRIPTION OF THE PREFERRED EMBODIMENTS

Figure 1A:
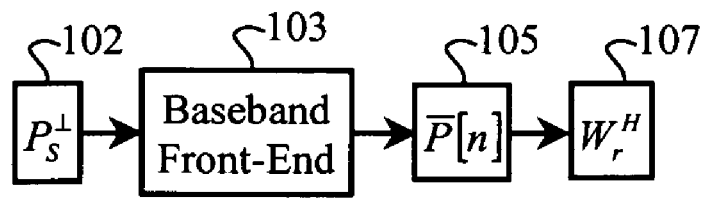
FIG. 1A illustrates a prior-art receiver with a projection canceller.

While the invention is susceptible to various modifications and alternative forms, specific embodiments thereof are shown by way of example in the drawings and are herein described in detail. It should be understood, however, that the exemplary embodiments are not intended to limit the invention to the particular forms disclosed. Instead, the invention is to cover all modifications, equivalents, and alternatives falling within the spirit and scope of the invention as defined by the claims.

Figure 1B:
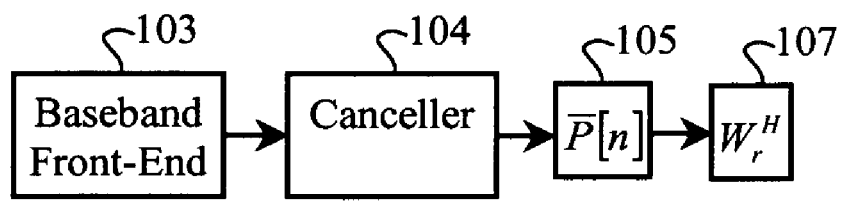
FIG. 1B illustrates a receiver equipped to cancel interference in a signal received by a Rake finger having a canceller placed downstream from a baseband front-end.

FIG. 1B illustrates an exemplary receiver embodiment of the invention. At least one transmitter (not shown) comprises a plurality of transmission system components (such as coding, spreading, and modulation blocks) configured for conditioning an information signal for coupling into a communication channel. The receiver processes a radio communications signal received from a wireless link by an antenna (not shown). The received signal may include components associated with multiple transmitted spread spectrum signals intended for multiple users.

The exemplary receiver comprises a baseband front-end 103 that typically includes one or more receiver system components (not shown) for converting an analog baseband signal to a digital baseband signal (referred to as a received baseband signal). The baseband front-end 103 may include a receiver pulse-shaping filter (not shown), a delay compensator (not shown), a chip-rate sampler (not shown), and a serial-to-parallel converter (not shown).

A canceller 104 is positioned downstream from the baseband front-end 103 and configured to produce one or more interference-canceled versions of the received baseband signal. The canceller 104 may include a projection operator or a scale-invariant subtraction operator configured to cancel interference in signals output from the baseband front-end 103. A PN descrambler 105 (which may be referred to as a descrambler) descrambles the output of the canceller 104 (which may include the received baseband signal and/or an interference-cancelled signal). The PN descrambler 105 may resolve the canceller 104 output into a plurality of multipath components that correspond to respective signal paths. This may be achieved by correlating the received baseband signal with time-shifted versions of a scrambling sequence. However, it will be appreciated by those skilled in the art that resolution of the baseband signal into multipath components may be achieved by other techniques, such as by correlating the scrambling sequence with time-shifted versions of the baseband signal.

A Walsh despreader 107 (which may be referred to as a despreader) correlates each multipath component with each of a set of Walsh codes (e.g., a set of multiple-access codes that may be used at any given time in the wireless communications system). In embodiments in which the spreading sequences make up a Walsh-Hadamard code, the despreader 107 preferably includes a bank of fast Walsh transformers (FWTs) to increase computational efficiency. However, it will be appreciated that other correlator structures may be used in embodiments of the present invention, such as correlator banks configured to perform FWTs.

Figure 1C:
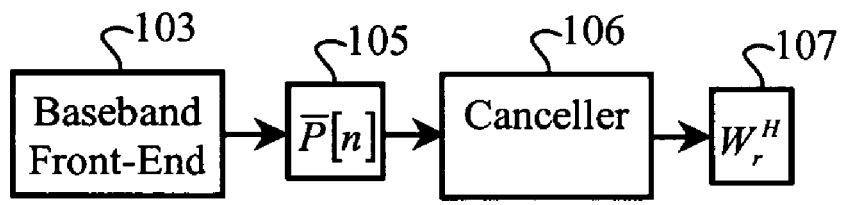
FIG. 1C illustrates an alternative receiver embodiment having a canceller placed farther downstream from a baseband front-end.
Figure 1D:
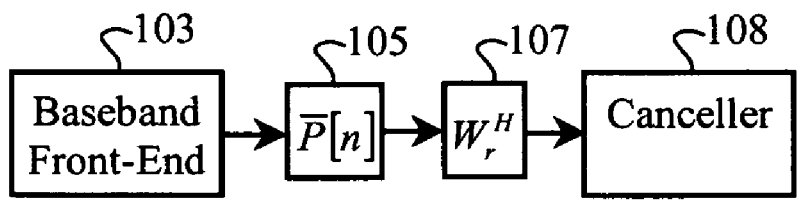
FIG. 1D illustrates yet another receiver embodiment comprising a canceller placed downstream from a baseband front-end.

Embodiments of the invention may provide for placement of a canceller at any of various locations downstream from the baseband front-end 103. In FIG. 1C, a canceller 106 is located between the PN descrambler 105 and the Walsh despreader 107. The canceller 106 may include a projection operator or a scale-invariant subtraction operator configured to cancel interference in signals output from the PN descrambler 105. In FIG. 1D, a canceller 108 follows the Walsh despreader 107. The canceller 108 may comprise a projection operator or a scale-invariant subtraction operator configured to cancel interference in signals output from the Walsh despreader 107. Thus, interference cancellation may be performed for the data symbol constellation. In each embodiment, a synthesized interfering signal is produced to conform to the type of received baseband signal processed by the canceller 104, 106, and 108, wherein the type of received baseband signal depends on the location of the canceller 104, 106, and 108 in the receiver.

Figure 2A:
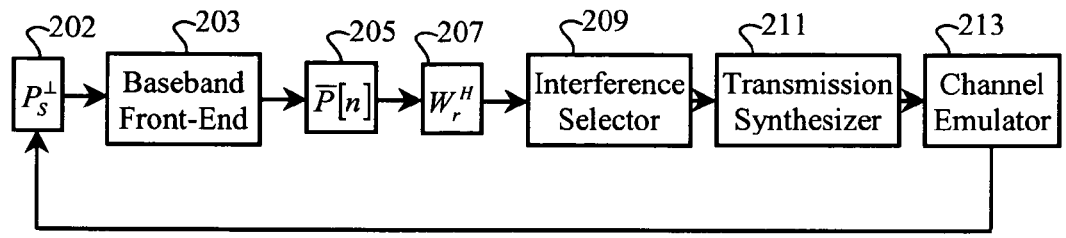
FIG. 2A is a detailed illustration of a prior-art receiver with a projection canceller.
Figure 2B:
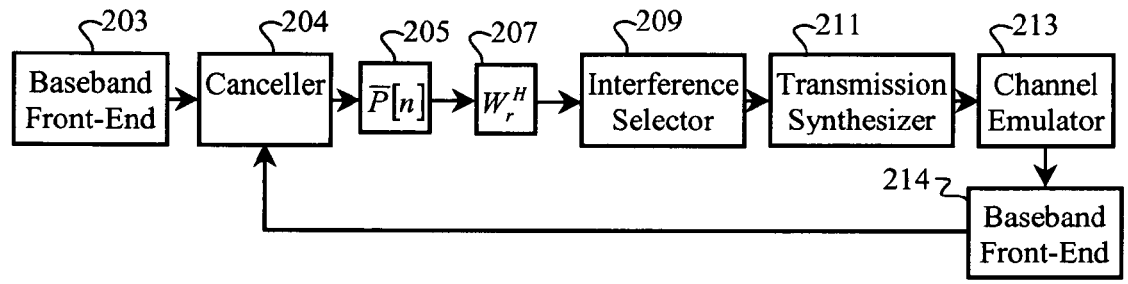
FIG. 2B is a detailed illustration of a receiver equipped to cancel interference in a received signal by a canceller placed downstream from a baseband front-end.

FIG. 2B shows an embodiment of the present invention including a baseband front-end 203, a baseband canceller 204, a PN descrambler 205, a Walsh despreader 207, an interference selector 209, a transmission synthesizer 211, a channel emulator 213, and a second baseband front-end 214 that is coupled back to the canceller 204.

The PN descrambler 205 may resolve a received baseband signal into a plurality of multipath components that correspond to respective signal paths for processing by multiple Rake fingers. Symbol outputs produced by the Walsh despreader 207 may optionally be combined (e.g., by a maximal ratio combiner or some other type of combiner, which is not shown) with outputs of other diversity channels, such as other Rake fingers. The interference selector 209 processes the symbol outputs (or the combined symbol outputs if the combiner is employed) to detect spreading sequences associated with interfering components in the received baseband signal. For example, the interference selector 209 may detect spreading sequences (i.e., subchannels) having energies that exceed a predetermined threshold. Alternatively, the interference selector may select a predetermined number of the strongest subchannels. Such interference selection techniques are described in U.S. patent application Ser. No. 11/100,935 (filed Apr. 7, 2005), which is assigned to the assignee of the present application, and incorporated herein by reference in its entirety.

The interference selector 209 may be configured to generate respective symbol estimates for symbols encoded onto the selected subchannels. The symbol estimates for the selected interferers are then processed by the transmission synthesizer 211, which spreads and scrambles the symbol estimates according to their corresponding Walsh codes and PN sequences, respectively, to produce a synthesized interference signal. Walsh-spread signals may be summed to produce a composite signal prior to PN scrambling. The transmission synthesizer 211 may be configured to perform additional baseband-processing operations, such as pulse shaping. A channel emulator 213 may employ channel estimates to produce an estimated interfering signal (i.e., a composite estimate of the interfering signal multipath components). In a preferred embodiment of the invention, the channel emulator 213 may track signals identified as strong sources and/or strong multipath components.

The baseband front-end processor 214 conditions the estimated interfering signal such that both the estimated interfering signal and the received baseband signal are provided with similar receiver processing before being input to the canceller 204. The canceller 204 modifies the received baseband signal (or a previous interference-cancelled signal) based on the estimate of the interfering signal, generating a new, interference-canceled version of the received baseband signal. Interference cancellation for a particular finger may employ an estimated interfering signal derived from at least one other finger.

Figure 2C:
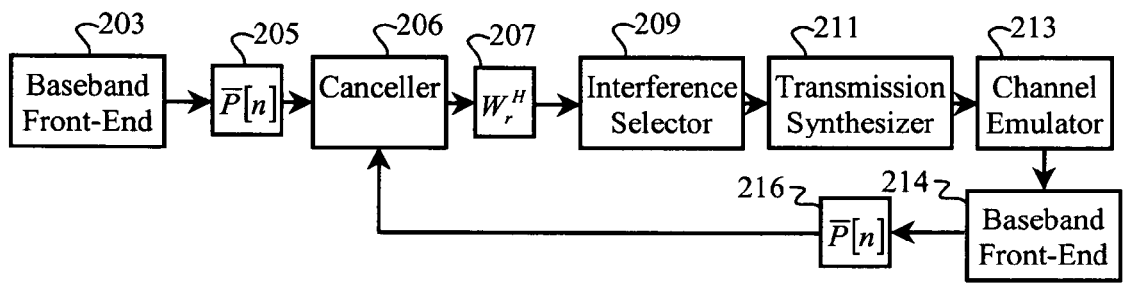
FIG. 2C is a detailed illustration of an alternative receiver embodiment having a canceller placed farther downstream from a baseband front-end.

In FIG. 2C, a canceller 206 is located further downstream from the baseband front-end 203 and the PN descrambler 205. The canceller 206 may be located in a finger. The estimated interfering signal is processed by the baseband front-end processor 214 and a PN descrambler 216 to match the receiver processing performed by the baseband front-end processor 203 and the PN descrambler 205 on the received baseband signal.

Figure 2D:
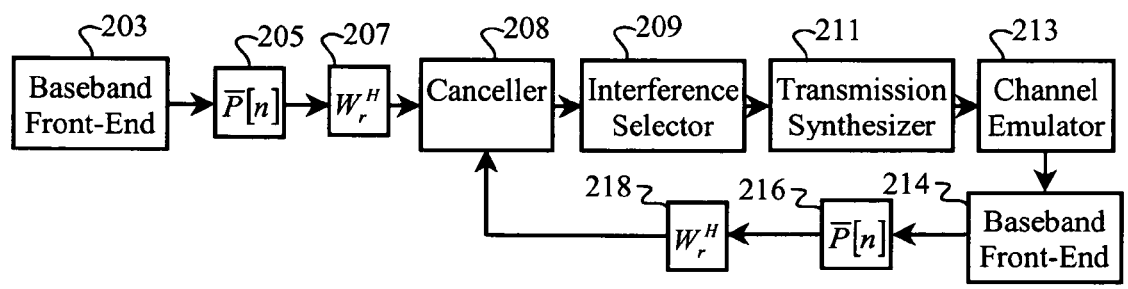
FIG. 2D is a detailed illustration of yet another receiver embodiment having a canceller placed downstream from a baseband front-end.

In FIG. 2D, a canceller 208 is located downstream from the Walsh despreader 207, which follows the baseband front-end 203 and the PN descrambler 205. Thus, the estimated interfering signal is processed by a Walsh despreader 218 that follows the baseband front-end 214 and the PN descrambler 216. Interference cancellation 208 is performed on data symbols estimated from the received baseband signal.

Both the received baseband signal and the estimated interfering signal (which may be derived from selected subchannels from other Rake fingers) undergo substantially identical signal-processing operations until the canceller 204, 206, or 208. Thus, embodiments of the invention may configure the receiver processing of the estimated interfering signal according to where in the receiver chain the canceller 204, 206, or 208 is located.

Baseband cancellers 204, 206, and 208 may use a number of different techniques to modify the current version of the baseband signal based on the estimate of the interfering signal component. For example, a projection technique may be employed wherein the canceller 204, 206, or 208 determines a projection of the current baseband signal in a direction orthogonal to the estimate of the interfering signal. In a preferred embodiment, the canceller 204, 206, or 208 may include any means for projection cancellation configured to construct an orthogonal or oblique projection matrix for orthogonally or obliquely projecting a received signal with respect to an interference subspace. Alternative embodiments of the invention may provide for scale-invariant subtraction.

Some embodiments of the invention may be configured to recursively perform interference cancellation. In a subsequent iteration, the new version of the baseband signal may be processed in a manner similar to the original baseband signal. If an iteration criterion is satisfied, symbol estimates produced by the Walsh despreader 207 may be used to generate an estimate of a signal of interest. If the iteration criterion is not satisfied, outputs from the Walsh despreader 207 may be used to generate new estimates of interfering signal components in the manner described previously.

An optional step may include extracting transmission-source information (such as source-specific scrambling codes) if transmissions from two or more sources are received. The channel estimates and initial symbol estimates of the transmitted signals may be used to synthesize at least one multipath component from at least one source. A canceller (such as a subtractive canceller or projection canceller) may process the synthesized signal to remove one or more interfering signals (e.g., multipaths from one or more sources) from a predetermined Rake finger or multipath processor.

As is well-known in the art (such as disclosed in U.S. patent application Ser. No. 11/100,935, filed Apr. 7, 2005, which is hereby incorporated by reference), a canceller may provide an optional signal-selection process to produce a linear combination of at least one interference-cancelled signal and at least one uncancelled signal, such as to produce a signal output having an SINR greater than (or at least equal to) the at least one uncancelled signal. In some cases, interference cancellation may result in a less-desirable signal (e.g., a signal having a lower SINR) than the original signal input. Thus, it may be advantageous to select the signal having the highest SINR, rather than assuming that interference cancellation always yields an improved signal, such as disclosed in U.S. patent application Ser. No. 10/669,954, filed Sep. 23, 2003, which is incorporated by reference.

The output of the projection canceller may be processed to produce soft-decision estimates of one or more transmitted signals. Soft-decision processing may include matched filtering, equalization, or other signal-processing techniques that are well known in the art. The soft-decision estimates for each Rake finger may be coherently combined to provide an estimate of the transmitted data. Such estimates may be made with respect to a signal of interest. Alternatively, such estimates may be processed by the interference selector 209.

Figure 3:
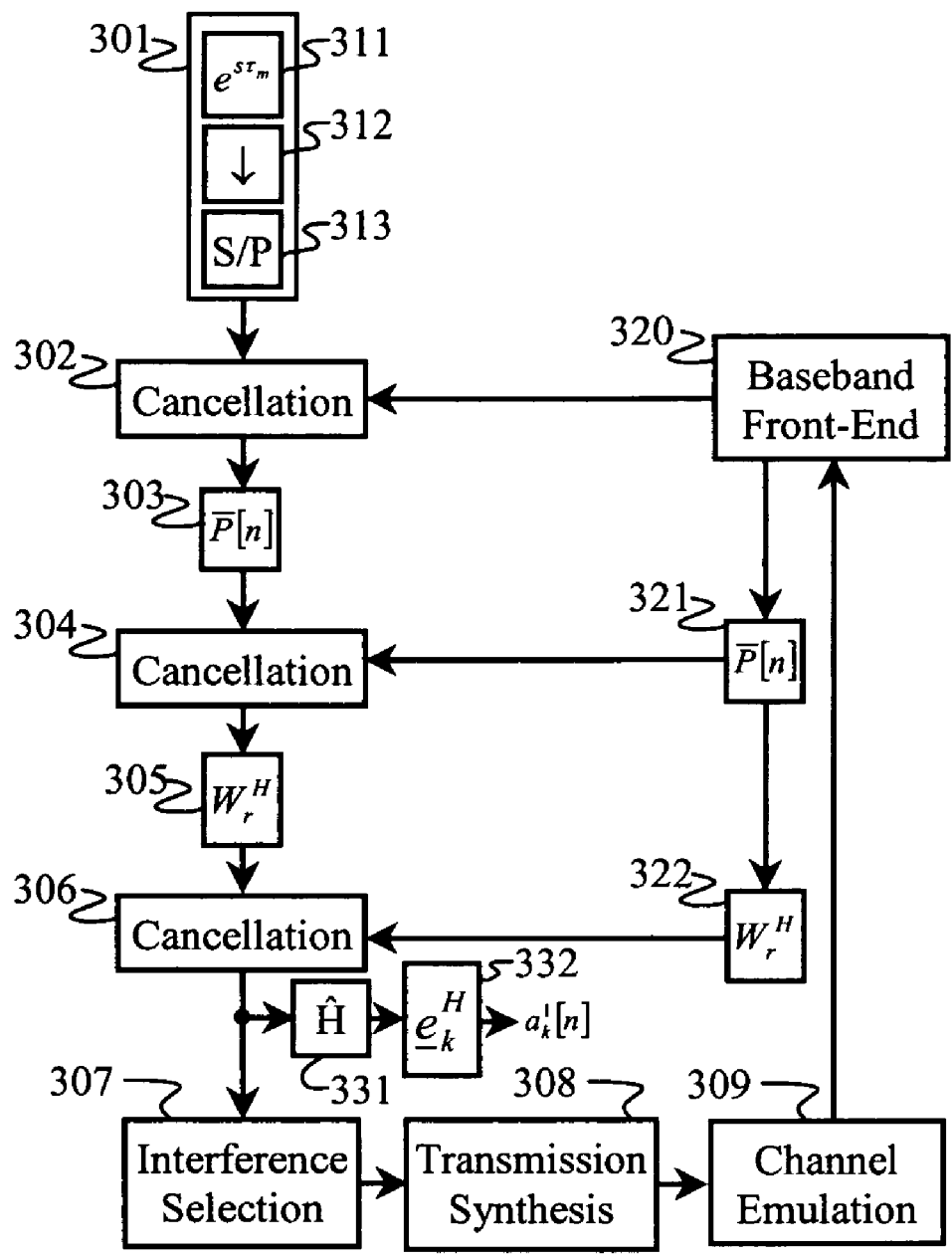
FIG. 3 illustrates a reception method in accordance with several exemplary embodiments of the invention.

FIG. 3 illustrates a reception method in accordance with several exemplary embodiments of the invention. Each of a plurality M of Rake fingers performs baseband front-end processing 301 for producing a digitized received baseband signal. Means for baseband front-end processing 301 may provide for delay compensation (denoted by $e^{s\tau_m}$) 311, chip-rate sampling (denoted by $\downarrow$) 312, and serial-to-parallel conversion (denoted by S/P) 313. Baseband front-end processing 301 may optionally include pulse-shape filtering (not shown). The reception method also includes descrambling (denoted by $\overline{P}[n]$) 303 and despreading (denoted by $W_r^H$) 305.

A Rake finger typically employs receiver-processing functions 301, 303, and 305, followed by channel compensation (denoted by $\hat{H}$) 331 and a traffic-Walsh selection (denoted by $\underline{e}_k^H$) 332. A Rake-finger output $a_k^l[n]$ corresponds to Walsh channel k at symbol period n in Rake finger 1. Outputs from different Rake fingers (denoted by $a_k^l[n], \ldots, a_k^M[n]$) are typically combined using any of various combining techniques that are well known in the art, including Maximal Ratio Combining (MRC), Equal Gain Combining (EGC), Minimum Mean Squared Error Combining (MMSEC), Minimum Variance Unbiased Combining (MVUC), and Selection Combining.

In an exemplary embodiment of the invention, means for descrambling 303 may include a PN-descrambler and means for despreading 305 may comprise a matrix Walsh operator. Furthermore, embodiments of the invention provide for processing each multipath signal with additional receiver functions (including 302, 304, or 306) configured to perform interference cancellation. For example, each multipath signal may be processed via interference cancellation, which may be provided at any of various steps 302, 304, and 306 downstream from the front-end processing 301.

The interference cancellation 302, 304, and 306 produces an interference-cancelled version of the multipath signal. The interference-cancelled signal or the uncancelled multipath signal may be inserted back into its corresponding Rake finger, such as illustrated in FIG. 3. Cancellation may optionally include any type of projection cancellation or scale-invariant subtractive interference cancellation. Signals from one or more Rake fingers may be used for constructing projection operators or subtraction operators used for cancellation.

Interference selection 307 may be configured to identify and select one or more interfering Walsh subchannels in each Rake finger's multipath signal. Interference selection 307 may be provided by any means (such as a correlator) configured for selecting at least one interfering symbol corresponding to at least one interfering subchannel (e.g., Walsh code). In an exemplary embodiment of the invention, interference selection 307 may disenable cancellation 302, 304, or 306 outputs if they fail to meet a quality criterion, such as coherence. In alternative embodiments, multiple cancellation outputs may be combined prior to being compared with a threshold. Thus, the interference selection 307 may include generalized MRC over subchannels and multipaths.

Transmission synthesis 308 is performed for each multipath, wherein the at least one interfering symbol is spread back onto its original subchannel (e.g., Walsh code), re-scrambled, and parallel-to-serial converted to produce a synthesized transmit version of at least one interference signal in at least one particular multipath signal. A means for synthesizing an interference signal may include a spreader (e.g., an FWT) and a scrambler (e.g., a PN scrambler). Channel emulation 309 is performed on each synthesized interference signal to produce an estimated interference signal. Channel emulation 309 may be configured to impart a delay to a particular synthesized signal in order to synchronize the synthesized interference signal with a particular received baseband signal. It should be noted that a means for providing channel emulation may include any interpolating filter that approximates the combined effects of a transmit filter and receiver matched-filter.

An exemplary embodiment may employ a linear interpolator to approximate composite effects of the transmitter, channel path, and receiver. An exemplary embodiment uses a raised-cosine pulse-shaping filter with the standard-specific roll-off factor for the transmit/receive filters.

After channel emulation 309, each estimated interference signal is coupled to a different Rake finger. For example, interference signals originating from a first Rake finger may be delayed by $\tau_1$ and coupled into an $M^{th}$ Rake finger. Similarly, interference signals originating from the $M^{th}$ Rake finger may be delayed by $\tau_M$ and coupled into the first Rake finger. In the case wherein cancellation 302 is employed, interference signals from the $M^{th}$ Rake finger undergo baseband front-end processing 320, which may include delay compensation (e.g., $\tau_1$ in a first finger), chip-rate sampling, and serial-to-parallel conversion. In one exemplary embodiment, cancellation 302 may produce an interference-cancelled signal by projecting the first multipath component of the received baseband signal onto a subspace that is substantially orthogonal to an interference subspace determined from the $M^{th}$ Rake finger's estimated interference signal.

In order to effectively cancel ISI, interference cancellation may be configured to process a sequence of estimated symbol vectors, rather than just an instantaneous symbol vector. Some embodiments may process a filtered sequence of estimated symbols. In these embodiments, the canceller may comprise an equalizing canceller that cancels inter-channel and inter-symbol interference due to multipath delay. Thus, cancellers corresponding to some embodiments of the invention may additionally provide for equalization.

In an alternative embodiment of the invention, the interference signal is descrambled 321 after baseband front-end processing 320, and then interference cancellation 304 is employed. In yet another embodiment of the invention, the descrambled interference signal may be despread 322 prior to providing for interference cancellation 306.

Cancellation 302, 304, and 306 may include selecting the interference-cancelled signal or the received baseband signal, or a linear combination thereof, by providing a comparison of the signals with respect to one or more signal quality measures. Signal quality measure may include SINR and/or coherence. The selected signal (or the linear combination of signals) may be provided with further processing to produce hard-decision or soft-decision estimates of the data. Multiple soft-decision estimates may be combined Although FIG. 3 illustrates transceiver-chain functionality with respect to a single source (e.g., a base station), the invention may be adapted to systems having multiple sources. Furthermore, since many receiver operations are commutative, the order of receiver operations may include alternative configurations. Various components shown herein may be consolidated into a single component. Similarly, certain components may be added and/or removed according to particular transceiver designs and communication protocols without departing from the spirit and scope of the invention.

It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as being without limitation to such specifically recited examples and conditions. Moreover, all statements herein reciting principles, aspects, and embodiments of the invention, as well as specific examples thereof, are intended to encompass both structural and functional equivalents thereof.

It should be appreciated by those skilled in the art that the block diagrams herein represent conceptual views of illustrative circuitry, algorithms, and functional steps embodying principles of the invention. Similarly, it should be appreciated that any flow charts, flow diagrams, system diagrams, mathematical formulae, and the like represent various processes which may be substantially represented in computer-readable medium and so executed by a computer or processor, whether or not such computer or processor is explicitly shown.

The functions of the various elements shown in the drawings, may be provided through the use of dedicated hardware as well as hardware capable of executing software in association with appropriate software. The functions may be provided by a single dedicated processor, by a shared processor, or by a plurality of individual processors, some of which may be shared. A processor may include, without limitation, digital signal processor (DSP) hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, or through the interaction of program control and dedicated logic, the particular technique being selectable by the implementer as more specifically understood from the context.

Any element expressed herein as a means for performing a specified function is intended to encompass any way of performing that function including, for example, a combination of circuit elements which performs that function or software in any form, including, firmware, micro-code or the like, combined with appropriate circuitry for executing that software to perform the function. Embodiments of the invention as described herein reside in the fact that the functionalities provided by the various recited means are combined and brought together in the manner which the operational descriptions call for. Applicant regards any means which can provide those functionalities as equivalent as those shown herein.

We claim:

1. A CDMA receiver, comprising
   a baseband front-end configured to perform baseband processing on a received baseband signal,
   a descrambler located downstream from the baseband front-end,
   a despreader located downstream from the descrambler,
   an interference selector configured to select at least one interfering symbol from at least one of the descrambler and the despreader for producing at least one selected interference symbol,
   a synthesizer coupled to the interference selector and configured to synthesize an interference signal from the at least one selected interference symbol,
   a channel emulator configured for imparting at least one channel distortion to the at least one interference signal, and
   a canceller located downstream from at least one of the baseband front-end, the descrambler, and the despreader.

2. The receiver recited in claim 1 wherein the channel emulator is configured to identify multipath components in the received baseband signal.

3. The receiver recited in claim 1, wherein the canceller is configured to process a sequence or a filtered sequence of estimated symbols.

4. The receiver recited in claim 1, wherein the canceller is configured to perform at least one of an orthogonal projection, an oblique projection, and a scale-invariant subtraction.

5. The receiver recited in claim 1, wherein the canceller is configured to produce soft-decision estimates of one or more transmitted signals.

6. The receiver recited in claim 1 configured to operate in at least one of a base station and a handset.

7. The receiver recited in claim 1 integrated in a chipset.

8. A CDMA reception method, comprising
   providing for baseband front-end processing of a received baseband signal for producing a digitized received baseband signal,
   providing for descrambling the digitized received baseband signal for producing a descrambled baseband signal,
   providing for despreading the descrambled baseband signal for producing a despread baseband signal,
   providing for selecting at least one interfering symbol from at least one of the descrambled baseband signal and the despread baseband signal for producing at least one selected interference symbol,
   providing for synthesizing an interference signal from the at least one selected interference symbol,
   providing for imparting at least one channel distortion to the at least one interference signal, and
   providing for cancellation located downstream from at least the baseband front-end processing.

9. The reception method recited in claim 8, wherein providing for cancellation is configured to process a sequence or a filtered sequence of estimated symbols.

10. The reception method recited in claim 8, further comprising providing for physical channel estimation to identify multipath components in the received baseband signal.

11. The reception method recited in claim 8, further comprising providing for producing soft-decision estimates of one or more transmitted signals.

12. The reception method recited in claim 8, wherein providing for cancellation further includes performing at least one of an orthogonal projection, an oblique projection, and a scale-invariant subtraction.

13. A chipset configured to perform the reception method recited in claim 8.

14. A digital computer system programmed to perform the method recited in claim 8.

15. A computer-readable medium storing a computer program implementing the method of claim 8.

16. A CDMA receiver, comprising
   means for baseband front-end processing of a received baseband signal for producing a digitized received baseband signal,
   means for descrambling the digitized received baseband signal for producing a descrambled baseband signal,
   means for despreading the descrambled baseband signal for producing a despread baseband signal,
   means for selecting at least one interfering symbol from at least one of the descrambled baseband signal and the despread baseband signal for producing at least one selected interference symbol,
   means for synthesizing an interference signal from the at least one selected interference symbol,
   means for imparting at least one channel distortion to the at least one interference signal, and
   means for cancellation located downstream from at least the baseband front-end processing.

17. The CDMA receiver recited in claim 16, wherein the means for cancellation is configured to process a sequence or a filtered sequence of estimated symbols.

18. The CDMA receiver recited in claim 16, further comprising means for physical channel estimation to identify multipath components in the received baseband signal.

19. The CDMA receiver recited in claim 16, further comprising means for producing soft-decision estimates of one or more transmitted signals.

20. The CDMA receiver recited in claim 16, wherein the means for cancellation further includes means for performing at least one of an orthogonal projection, an oblique projection, and a scale-invariant subtraction.

21. The CDMA receiver recited in claim 16, including at least one of handset, a base station, and a chipset.

* * * * *